United States Patent
Hartmann et al.

(10) Patent No.: US 11,338,425 B2
(45) Date of Patent: May 24, 2022

(54) CONTROL METHOD AND DUST EXTRACTION MODULE

(71) Applicant: Hilti Aktiengesellschaft, Schaan (LI)

(72) Inventors: Markus Hartmann, Mauerstetten (DE); Klaus-Peter Bohn, Schaanwald (LI); Bastian Pluemacher, Schwabmuenchen (DE); Thilo Hammers, Geltendorf (DE); Michael Brunner, Lammerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 435 days.

(21) Appl. No.: 16/342,101

(22) PCT Filed: Oct. 17, 2017

(86) PCT No.: PCT/EP2017/076425
§ 371 (c)(1),
(2) Date: Apr. 15, 2019

(87) PCT Pub. No.: WO2018/073214
PCT Pub. Date: Apr. 26, 2018

(65) Prior Publication Data
US 2019/0247991 A1    Aug. 15, 2019

(30) Foreign Application Priority Data
Oct. 20, 2016   (EP) ..................... 16194714

(51) Int. Cl.
*B25D 17/20*   (2006.01)
*B23Q 11/00*   (2006.01)
*B25D 16/00*   (2006.01)
*B23Q 17/00*   (2006.01)

(52) U.S. Cl.
CPC .......... *B25D 17/20* (2013.01); *B23Q 11/0046* (2013.01); *B23Q 17/00* (2013.01);
(Continued)

(58) Field of Classification Search
CPC .... B25D 17/20; B25D 17/22; B25D 2222/72; B25D 2250/221; B25D 2217/0057;
(Continued)

(56) References Cited

U.S. PATENT DOCUMENTS 6,216,800 B1    4/2001  Fletcher et al.
6,356,077 B1 *  3/2002  Schaer ................... G01L 1/048
                                                    324/209
(Continued)

FOREIGN PATENT DOCUMENTS

DE    102012221068    5/2014
DE    102013212022    1/2015

OTHER PUBLICATIONS

International Search Report of PCT/EP2017/076425, dated Jan. 17, 2018.

*Primary Examiner* — Thanh K Truong
*Assistant Examiner* — David G Shutty
(74) *Attorney, Agent, or Firm* — Davidson, Davidson & Kappel, LLC

(57) ABSTRACT

Control method for a dust extraction module (2) for a chiseling tool (5), including the following steps: using a fan (18) of the dust extraction module (2) to draw in an air flow Q from a certain place of a substrate (31) being worked by the tool (5), using a material detector (24) to identify the material M at the place of the substrate being worked by the tool (5), and adapting the suction power of the dust extraction module (2) as a function of the identified material M in order to set the air flow Q. The air flow Q is greater than or equal to a rated value Qo in the case of an iron-free mineral material M1, whereas the air flow Q is less than the rated value Qo in the case of a material M2 containing iron.

18 Claims, 3 Drawing Sheets

(52) U.S. Cl.
CPC ...... *B25D 16/00* (2013.01); *B25D 2217/0057* (2013.01); *B25D 2222/72* (2013.01); *B25D 2250/195* (2013.01); *B25D 2250/201* (2013.01); *B25D 2250/221* (2013.01); *B25D 2250/265* (2013.01)

(58) Field of Classification Search
CPC .... B25D 2217/0061; B25D 2217/0065; B25D 2217/0069; B25Q 11/005; B25Q 11/006; B25Q 17/12; B25Q 17/20
See application file for complete search history.

(56) References Cited

U.S. PATENT DOCUMENTS

| | | | |
|---|---|---|---|
| 6,640,205 B2 * | 10/2003 | Bongers-Ambrosius | B25D 16/00 702/190 |
| 6,981,557 B2 * | 1/2006 | Boeni | B25D 11/005 173/1 |
| 8,342,782 B2 * | 1/2013 | Nishikawa | B23Q 11/006 408/67 |
| 9,132,572 B2 * | 9/2015 | Ishikawa | B28D 7/02 |
| 10,759,035 B2 * | 9/2020 | Appel | B25D 17/02 |
| 2007/0107919 A1 * | 5/2007 | Strasser | B25F 5/00 173/1 |
| 2013/0136549 A1 * | 5/2013 | Appel | B23Q 17/00 408/56 |
| 2017/0173775 A1 * | 6/2017 | Ullrich | B23Q 1/0009 |
| 2018/0370008 A1 * | 12/2018 | Peters | B25D 16/006 |
| 2019/0247991 A1 * | 8/2019 | Hartmann | B23Q 11/0046 |
| 2020/0055173 A1 * | 2/2020 | Hartmann | B23Q 17/20 |

* cited by examiner

CONTROL METHOD AND DUST EXTRACTION MODULE

The present invention relates to a control method for a drill-chiseling hand-held power tool that rotates a drill bit while simultaneously striking the drill bit lengthwise.

BACKGROUND

U.S. Pat. No. 9,132,572 discloses a hammer drill with a dust collector. The hammer drill has a pneumatic striking mechanism which periodically strikes a drill bit. The drill bit is also rotated around its longitudinal axis. The hammer drill is employed especially to drill holes in mineral construction materials such as, for example, concrete. For this reason, the drill bits used are optimized for working mineral construction materials. The dust extraction module removes the generated drilling dust directly at the drilled hole, in order to keep dust out of the work environment of the user. Typically, concrete structures are provided with rebars, which can only be cut relatively slowly by the chiseling drill bit.

U.S. Pat. No. 6,640,205 describes a hammer drill that investigates reflections of shock waves in the drill bit when a substrate is being demolished. The nature of the material of the substrate is identified on the basis of the shock waves.

SUMMARY OF THE INVENTION

The control method according to the invention for a dust extraction module for a chiseling tool comprises the following steps: using a fan of the dust extraction module to draw in an air flow from a certain place of the substrate being worked by the tool, using a material detector to identify the material at the place of the substrate being worked by the tool, and adapting the suction power of the dust extraction module as a function of the identified material in order to set the air flow. The air flow is greater than or equal to a rated value in the case of an iron-free mineral material, whereas the air flow is less than the rated value in the case of a material containing iron.

A control method for a chiseling hand-held power tool having a dust extraction module comprises the following steps: periodical striking of a tool held in a tool socket of the hand-held power tool in order to work a certain place of a substrate; using a fan of the dust extraction module to extract an air flow from the place of the substrate being worked by the tool; using a material detector to identify the material at the place of the substrate being worked by the tool, and adapting the suction power of the dust extraction module as a function of the identified material in order to set the air flow, whereby the air flow is greater than or equal to a rated value in the case of a primarily mineral material, and whereby the air flow is less than the rated value in the case of a material containing iron, whereby the strikes are exerted onto the tool in the case of a primarily mineral material and in case of a material containing iron.

During standard operation, the dust extraction module removes the drilling dust generated by the switched-on hand-held power tool. For this purpose, the fan of the dust extraction module is switched on during operation of the hand-held power tool. The dust extraction module is supposed to continue in this standard operation when mineral material is being worked. The tip of the tool strikes mineral material. The dust extraction module then ensures a low-dust work environment and accelerates the progress of the drilling procedure by removing the drilling dust as rapidly as possible. The dust extraction module is supposed to interrupt the standard operation if material containing iron, especially a rebar, is encountered. The dust extraction module is not supposed to remove the drilling dust, especially any remaining mineral drilling dust, from the drilled hole. The interruption takes place independently of the hand-held power tool which is now using the tool to demolish the material containing iron. The dust extraction module resumes its standard operation when mineral material is once again being demolished.

In the case of material containing iron, the air flow Q is preferably one-fifth of the rated value at the maximum.

One embodiment provides for the material detector to use a vibration sensor to detect vibrations of the dust extraction module or vibrations of a hand-held power tool into which the chiseling tool has been inserted and for an evaluation unit to identify the material on the basis of the vibrations. During chiseling on rebars, vibrations increase in a characteristic manner as compared to chiseling on concrete. The detection of the material M via the vibrations is simple and reliable. A vibration above a threshold value is associated with a material containing iron whereas a vibration below the threshold value is associated with a primarily mineral material. Examples of parameters of the vibrations are acceleration values, displacements around a neutral position, etc.

One embodiment provides for the evaluation unit to transmit an actuating signal associated with the material to a fan control unit of the fan and, in response to the actuating signal, said fan control unit reduces the rotational speed of the fan in the case of a material containing iron as compared to the rotational speed in the case of a primarily mineral material.

One embodiment provides for detection of an activity of a hand-held power tool that is striking the tool. The air flow is drawn in as a response to the activity of the hand-held power tool.

One embodiment provides for the striking power of the hand-held power tool in the case of a material containing iron to differ by less than 20% from the striking power in the case of a primarily mineral material. The mineral material M1 as well as the material M2 containing iron are supposed to be chiseled, and thus the striking mechanism remains in operation.

One embodiment provides for the dust extraction module to be switched on at the beginning of the periodical striking.

A dust extraction device has a fan to draw in an air flow from a certain place of a substrate being worked by the tool, a dust filter, a dust collecting container, a material detector to identify a material at the place of the substrate being worked by the tool and a fan control unit. Depending on the identified material, the fan control unit adjusts the suction power of the dust extraction module in order to set the air flow. The air flow is greater than or equal to a rated value in the case of a primarily mineral material, whereas the air flow is less than the rated value in the case of a material containing iron.

BRIEF DESCRIPTION OF THE FIGURES

The description below explains the invention on the basis of embodiments given by way of an example. The figures show the following.

Unless otherwise indicated, identical or functionally equivalent elements are designated in the figures by the same reference numerals.

DETAILED DESCRIPTION

Figure 1:
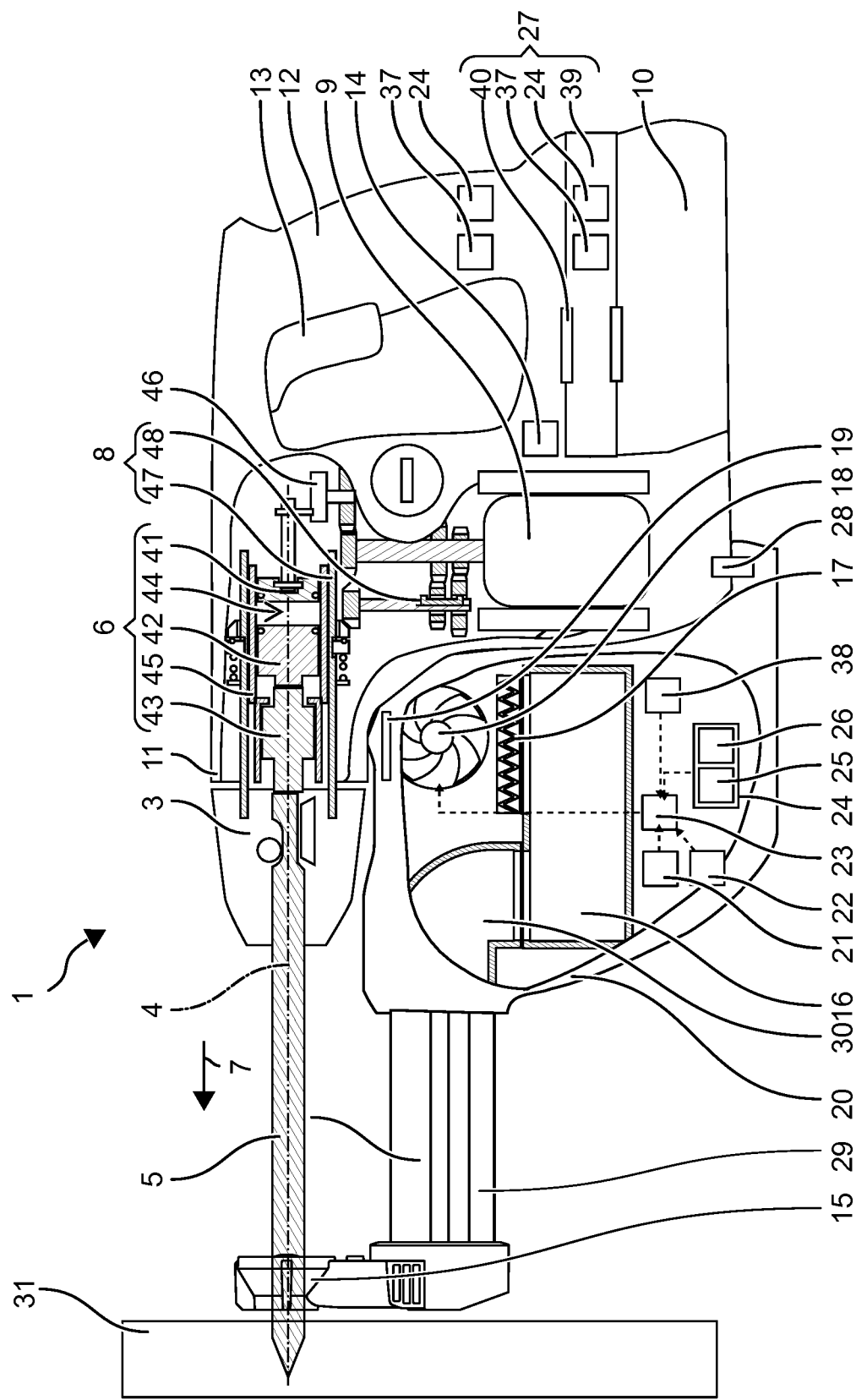
FIG. 1: a hammer drill with a dust extraction module.
Figure 2:
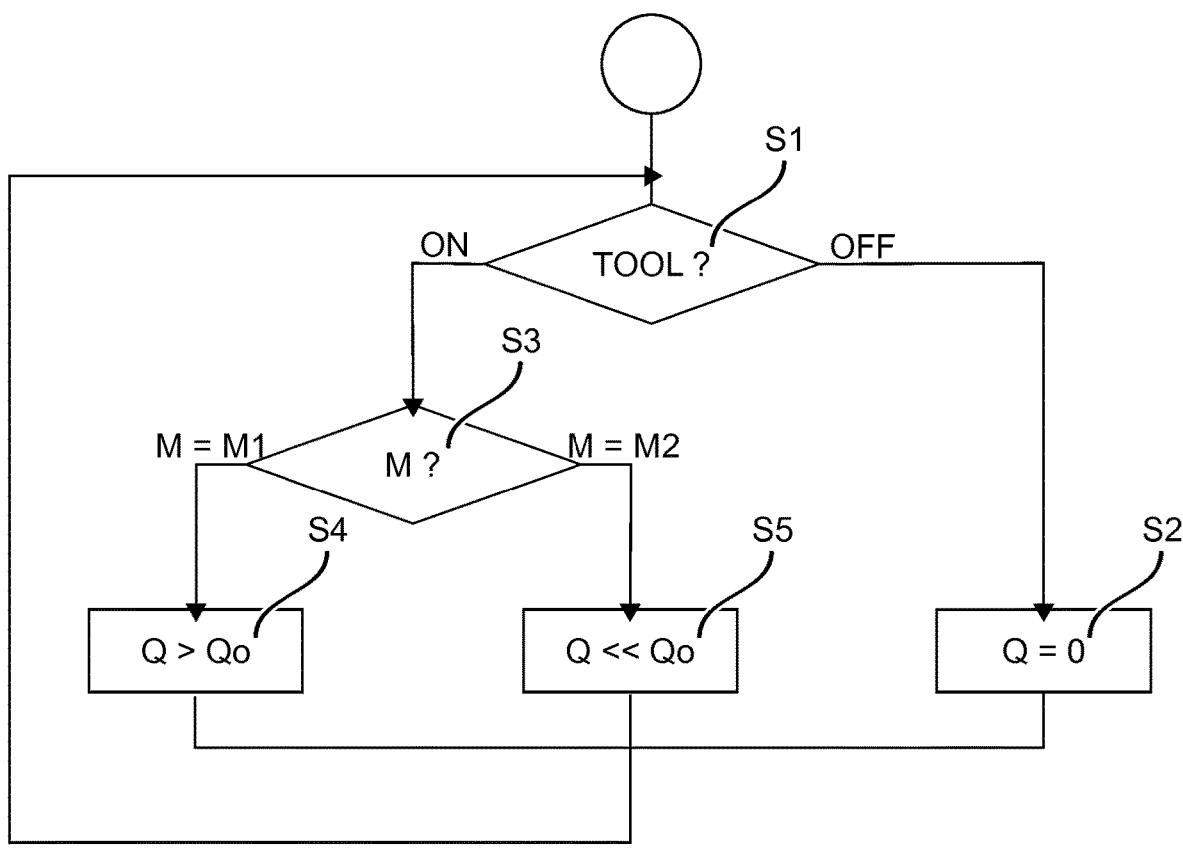
FIG. 2: a control method for the dust extraction module.

FIG. 1 schematically shows a hammer drill 1 having a hand-held dust extraction module 2 that serves to extract generated drill cuttings. The hammer drill 1 is an example of a striking hand-held power tool. The dust extraction module 2 is indirectly guided by the hand-held power tool.

The hammer drill 1 has a tool socket 3 into which a drill bit, a chisel or another striking tool 5 can be inserted coaxially to the working axis 4 and locked in place. The hammer drill 1 has a pneumatic striking mechanism 6 that can periodically strike the drill bit 5 in a striking direction 7. A rotary drive 8 can continuously rotate the tool socket 3 around the working axis 4. The pneumatic striking mechanism 6 and the rotary drive are driven by an electric motor 9 that is supplied with electric power from a battery 10 or from a mains cable.

The striking mechanism 6 and the rotary drive 8 are arranged in a machine housing 11. A handle 12 is typically located on a side of the machine housing 11 facing away from the tool socket 3. By means of the handle 12, the user can keep the hammer drill 1 in operation and can guide it. An additional auxiliary handle can be affixed near the tool socket 3. On or near the handle 12, there is an operating switch 13 which the user can actuate, preferably with the same hand that is holding the machine. The electric motor 9 is switched on by actuating the operating switch 13. Typically, the electric motor 9 rotates as long as the switch 13 is held in the depressed position. The hammer drill 1 typically has a power regulator 14 that keeps the striking power of the striking mechanism 6 constant. The regulation is based, for instance, on the regulation of the rotational speed of the electric motor 9.

The dust extraction module 2 comprises the following in consecutive order along the flow direction: a suction nozzle 15, a dust collecting container 16, a dust filter 17 and a fan 18. The suction nozzle 15 rests against the drill bit 5. The fan 18 generates an air flow Q that enters the dust extraction module 2 at the suction nozzle 15. The incoming air transports the dust away from the drill bit 5. The dust-laden air flows into the dust collecting container 16. The dust is deposited on the dust filter 17, the purified air reaches the fan 18 and exits near the fan 18 through openings 19 in the housing 20.

The dust extraction module 2 is preferably automatically switched on and off directly or indirectly by the hammer drill 1. The dust extraction module 2 is preferably inactive when the hammer drill 1 is inactive (step S1 TOOL OFF). The air flow conveyed by the dust extraction module 2 equals zero, for instance, because the fan 18 is standing still. The dust extraction module 2 is active when the hammer drill 1 is active (step S1 TOOL ON).

The fan 18 can be connected, for example, to the power supply of the hammer drill 1. The operating switch 13 of the hammer drill 1 synchronously connects the power supply for the electric motor 9 and for the fan 18. Switching off can likewise be carried out synchronously. In an alternative, the fan 18 is switched off (step S2) after the electric motor 9 with a delay of several seconds.

The fan 18 can be indirectly switched on and/or off by the operating switch 13. For instance, the dust extraction module 2 has a sensor 21, e.g. an ampere meter, to detect the power consumption of the hammer drill 1, also a sensor 22 to detect electromagnetic alternating fields of the electric motor 9, etc. Indirect switching on is particularly advantageous for dust extraction modules 2 having an independent power supply. The dust extraction module 2 can be manually put on sleep mode by the user, and it can be woken up from this mode by means of the operating switch 13.

A fan control unit 23 controls the fan 18. The fan control unit 23 can have an unregulated configuration, that is to say, without feedback. The rotational speed of the fan 18 and the air flow in the dust extraction module 2 are prescribed by the load limit of the fan 18 or of the power supply. The fan control unit 23 can be regulated. The air flow Q, the rotational speed or the pressure in the dust extraction module 2 can be adjusted to a target quantity, for example, in that the power consumption of the fan 18 is adapted, or else the rotational speed is regulated in such a way that a constant air flow Q into the suction nozzle 15 is ensured. For instance, the rotational speed or the power consumption of the fan 18 increases when an elevated quantity of dust is ascertained in the drawn-in air. For example, the rotational speed can also be adapted as a function of the filling level in the dust collecting container 16, as a function of the pressure in the dust nozzle 15 or as a function of the pressure in the environment of the fan 18, etc.

A material detector 24 continuously or periodically checks which material M the drill bit S is working (step S3). The dust extraction module 2 carries out a (standard) operation if the material is a mineral material M1, for instance, concrete, brick, natural stone. The fan 18 conveys a sufficient air flow Q to carry the drill cuttings away (step S4). A rotational speed—regulated or unregulated—of the fan 18 is equal to or greater than a rated value. The air flow Q is correspondingly greater than a rated value Qo. The rated value Qo is, for example, within the range from 4 l/s (liters per second) to 10 l/s. The dust extraction module 2 interrupts operation if the drill bit 5 is working a metallic material M2, for example, rebar. During the interruption of the operation, the air flow Q is reduced at least to such an extent that essentially no drill cuttings are conveyed out of the drilled hole (step S5). For example, the power supply to the fan 18 is interrupted. The fan 18 can also be braked, for instance, by means of regenerative braking or by means of a resistance brake. As an alternative, the rated value for the air flow Q or the rotational speed can be set to less than one-fifth of the rated value Qo during operation, for instance, to zero. Alternatively or additionally, the suction power can be reduced by a bypass. For example, a ventilation flap next to the fan 18bz is opened. As a result, the air flow Qbz at the suction nozzle 15bz is reduced. Moreover, the air flow Qbz between the suction nozzle 15bz and the fan 18bz can be reduced by a throttle or by a check valve for purposes of reducing the suction power. The standard operation is preferably resumed automatically once the rebar has been cut and the drill bit 5 is once again working mineral material.

The hammer drill 1 demolishes the mineral material M1 and the material M2 containing iron in essentially the same manner. The striking power of the striking mechanism 6 is the same for recognized mineral material M1 and recognized material M2 containing iron. Optionally, due to the different loads on the hammer drill 1 for the different materials, the striking power for material M2 containing iron can be lowered somewhat, for instance, by up to 20% as compared to the striking power for mineral material M1. In a variant, the rotational speed of the rotary drive for material M2 containing iron can be less than the rotational speed for mineral material M1.

The material M is checked by means of a material detector 24. The material detector 24 can evaluate the reflected shock wave in the tool 5 as is described, for example, in U.S. Pat. No. 6,640,205. Another material detector 24 given by way of example has a vibration sensor 25 to detect vibrations and it also has an evaluation unit 26. The drill bit 5 is subject to different counterforces during striking work on mineral material and on material containing iron. The vibrations in the hammer drill 1 in the case of a material containing iron are far greater than in the case of rock or other mineral materials M1.

The vibration sensor 25 is in contact with the drill bit 5 via a sound bridge. The vibration sensor 25 can be arranged, for example, in the dust extraction module 2, in the hammer drill 1 or in a third unit 27. The sound bridge is created by a mechanical connection via one or more stiff elements such as, for instance, the tool socket 3, the striking mechanism 6, the machine housing 11, the housing 20 or the suction nozzle 15.

The vibration sensor 25 has, for example, a cantilevered arm to which a piezoelectric polymer film has been applied. When the arm is excited by vibrations, it generates an electric signal that is evaluated by the vibration sensor 25. The vibration sensor 25 can be an acceleration sensor that issues acceleration values as a parameter of vibrations. By the same token, the vibration sensor 25 can be a microphone, preferably designed to detect infrasound noises.

The evaluation unit 26 compares the vibrations detected by the vibration sensor 25, for example, to a threshold value. Falling below the threshold value is associated with drilling in mineral material M1 whereas, exceeding the threshold value is associated with drilling in a material M2 containing iron. The threshold value can be ascertained by means of a series of experiments. The threshold value can be stored in the evaluation unit 26. Instead of a comparison to an individual threshold value, it is possible to distinguish between drilling in rock and drilling in material containing iron on the basis of a more complex fingerprint. The vibrations can be detected in one or more frequency bands and then compared to the appertaining threshold values. A frequency band has, for instance, the number of strikes as the central frequency and, for instance, a bandwidth of half the number of strikes at the maximum.

The dust extraction module 2 is, for example, attached to the hammer drill 1 (FIG. 1). The dust extraction module 2 has its own sealed housing 20. The housing 20 can be placed, for instance, on the machine housing 11 of the hammer drill 1 and then locked in place on the machine housing 11 by means of a catch 28. The catch 28 can be released manually by the user and the dust extraction module 2 can then be detached from the hammer drill 1. Instead of or in addition to the catch 28, a wide array of other attachment modalities are known, among others, dovetail joints, slides or spring-loaded pins. Instead of a detachable dust extraction module 2, it is also possible for the dust extraction module 2 to be permanently joined to the hand-held power tool or else to be integrated into the hand-held power tool. During operation, the user can hold and guide the hammer drill 1 and the dust extraction module 2 by means of the handle 12 of the hammer drill 1.

The suction nozzle 15 given by way of an example is configured so as to be ring-shaped and it surrounds the drill bit 5. The housing 20 of the dust extraction module 2 is dimensioned in such a way that the suction nozzle 15 is concentric to the working axis 4 of the hammer drill 1. The suction nozzle 15 is connected to the dust collecting container 16 via a channel 30 situated in a telescopic part 29. The telescopic part 29 is preferably pre-tensioned in the striking direction 7, as a result of which the suction nozzle 15 automatically comes to rest on the substrate 31. The suction nozzle 15 preferably extracts the dust directly at the drilled hole.

The vibration sensor 25 is, for instance, rigidly joined to the housing 20 that is attached to the hammer drill 1. The vibrations of the drill bit 5 are transmitted to the hammer drill 1 via the tool socket 3 and via the striking mechanism 6. The catch 28 or the housing 20 resting against the hammer drill 1 form a sound bridge of sufficient quality so that the vibrations of the drill bit 5 can be indirectly measured in the dust extraction module 2.

Figure 3:
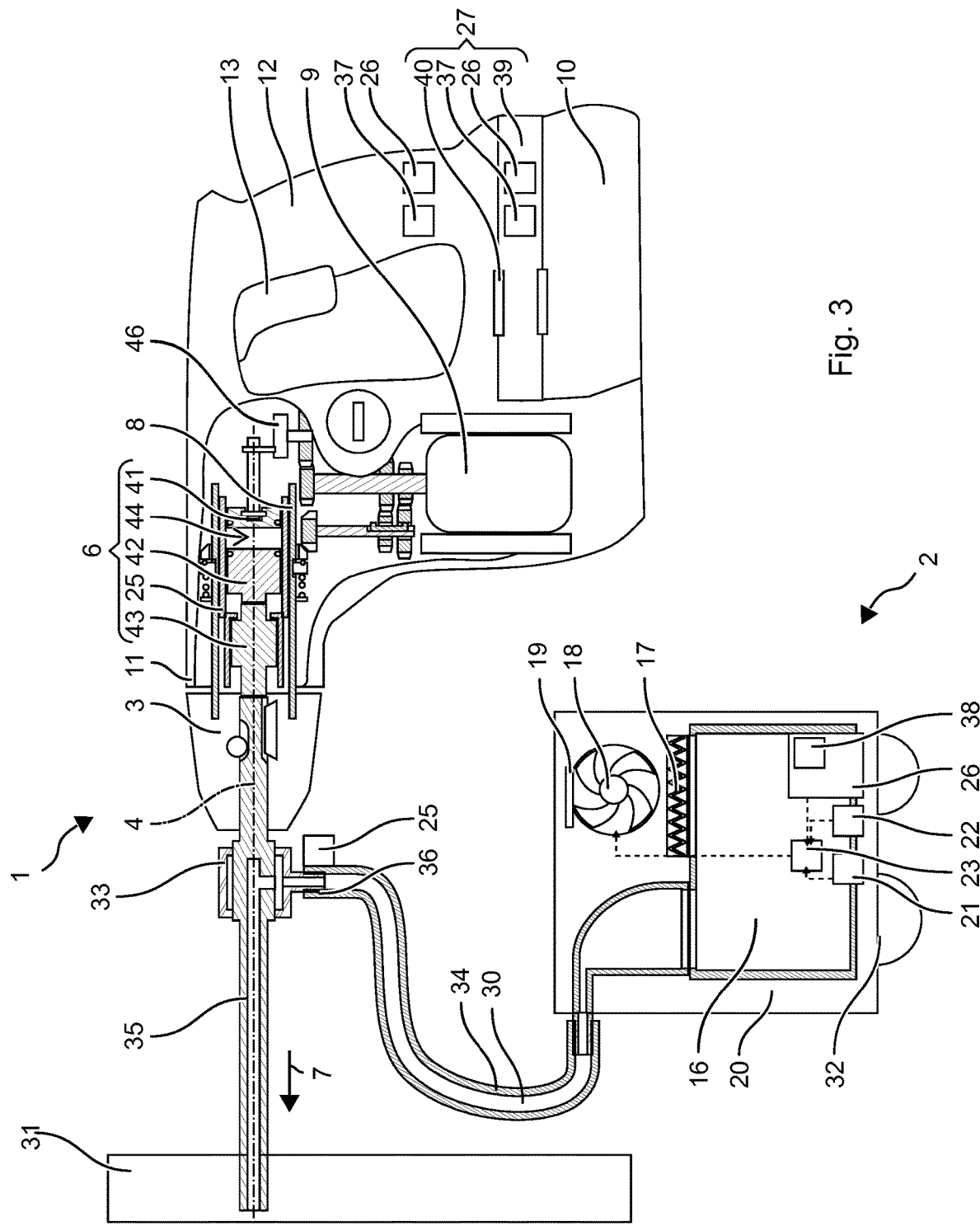
FIG. 3: a hammer drill with a dust extraction module.

FIG. 3 shows the hammer drill 1 with a dust extraction module 2 that is not being hand held. During operation, the housing 20 of the dust extraction module 2 stands on the ground separately from the hammer drill 1. The dust extraction module 2 given by way of an example has wheels 32 on its housing 20. The dust collecting container 16, the dust filter 17 and the fan 18 are situated inside the housing 20.

The suction nozzle 33 given by way of an example is placed onto the drill bit 5. The suction nozzle 15 is held and guided by the user indirectly by means of the hammer drill 1. The suction nozzle 15 is connected via a flexible hose 34 to the dust collecting container 16. The channel 30 runs inside the hose 34.

The suction nozzle 33 given by way of an example is firmly joined to the drill bit 5. The suction nozzle 33 is configured specifically for suction drill bits 35. Suction drill bits 35 do not have transport flutes, but rather, they have one or two suction channels that run inside the shank all the way to the drill head. Close to their insertion end, the suction drill bits 35 have a radial cutout to which the suction nozzle 33 can be connected. The suction nozzle 15 can rotate relative to the drill bit 5, but typically it is fixed along the working axis 4. The hose 34 has a placement end 36 that can be detachably attached to the suction nozzle 33 without a tool 5.

The vibration sensor 25 of the material detector 24 can be advantageously attached to the placement end 36. The vibrations of the drill bit 5 are transmitted to the suction nozzle 15 and to the placement end 36. The measuring signals of the vibration sensor 25 can be transmitted via a signal line in the hose 34 or else can be transmitted wirelessly to the evaluation unit 26.

The vibration sensor 25 can be employed to switch on the dust extraction module 2. The evaluation unit 26 compares the vibrations to a lower limit. The lower limit is selected to be so low that it correlates with a switched-off hammer drill 1. If the vibrations are below the lower limit, the evaluation unit 26 deactivates the dust extraction module 2, for example, in accordance with step S2. If the detected vibrations exceed the lower limit, the evaluation unit 26 interprets this as a switched-on hammer drill 1 (step S1, TOOL ON). The threshold value for distinguishing between working a mineral material M1 and working a material M2 containing iron is considerably higher than the lower limit. The threshold value for various power classes of the hammer drill 1 can be ascertained by means of a series of experiments. In one refinement, the threshold value for various tools can be ascertained. The hammer drill 1 can recognize, for instance, an inserted tool 5 by means of a sensor and can specify the threshold value in accordance with the tool 5. One refinement takes into account the different sound of chiseling on concrete and on steel. One variant takes into consideration only a portion of the vibrations within a given frequency range for purposes of the comparison to the threshold value, for instance, within a frequency range between 200 Hz and 2 kHz, which can be associated with the higher-pitched sound of metal striking metal. Another variant compares a low-frequency portion to a high-frequency portion. The evaluation unit 26 compares the mean amplitude of the low-frequency portion to the mean amplitude of the high-frequency portion. A relative rise in the high-frequency portion in comparison to the low-frequency portion indicates work on material containing iron. The evaluation unit 26 compares the relative portion to a suitable threshold value. The evaluation unit 26 can identify the signal strength within the frequency ranges, for instance, by means of a Fourier analysis or else it can identify it through analog filters.

Regarding the structure and mode of operation of the evaluation unit 26, reference is hereby made to the description pertaining to the embodiment of FIG. 1.

The material detector 24, for example, the evaluation unit 26 and the vibration sensor 25, can be arranged in the dust extraction module 2 or in the hand-held power tool 1 or in a third unit 27. The identification as to whether the drill bit 5 is working mineral material or material containing iron can be carried out by the dust extraction module 2, by the hammer drill 1 or by a third unit 27.

The hammer drill 1 or the third unit 27 comprises the material detector 24 with the evaluation unit 26 and the vibration sensor 25. The material detector 24 is coupled to a transmitter 37 that transmits the evaluation result of the material detector 24 in a message. The message contains information as to whether the drill bit 5 is currently working mineral material M1 or material M2 containing iron. The transmitter 37 can operate wirelessly or else it can be hard-wired. The fan control unit 23 of the dust extraction module 2 has a communication interface 38 to receive the messages. The communication interface 38 is accordingly wireless or hard-wired. The fan control unit 23 can interrupt the standard operation of the dust extraction module 2 when the message indicates work on a material M2 containing iron. The fan control unit 23 ends the interruption, that is to say, the dust extraction module 2 resumes its operation, if the message indicates work on a mineral material M1.

The third unit 27 can have, for instance, a housing 39 that is separate from the hammer drill 1 and from the dust extraction module 2. The third unit 27 can be attached to the hammer drill 1. For example, the third unit can be arranged as a plug-in part between the battery 10 and the hammer drill 1. At the opposite housing sides of the third unit 27, there are electromechanical interfaces 40 corresponding to the hammer drill 1 and the battery 10.

In the striking direction 7, the pneumatic striking mechanism 6 has an exciter 41, a striker 42 and striking pin 43. The electric motor 9 forces the exciter 43 to execute a periodic motion along the working axis 4. For purposes of converting the rotational motion of the electric motor 9 into a periodic, translatory motion along the working axis 4, the exciter 41 is attached via a gear component 41. A gear component given by way of an example comprises an eccentric wheel or a wobble plate. A period of the translatory motion of the exciter 41 is prescribed by the rotational speed of the electric motor 9 and optionally by a reduction ratio in the gear component.

The striker 42 is coupled to the motion of the exciter 41 via an air spring. The air spring is formed by a sealed pneumatic chamber 44 situated between the exciter 41 and the striker 42. The striker 42 moves in the striking direction 7 until it strikes the striking pin 43. The striking pin 43 rests on the drill bit 5 in the striking direction 7 and it transfers the strike to the drill bit 5. The period of the motion of the striker is identical to the period of the motion of the exciter 41. Therefore, the striker 42 strikes at a striking rate that is equal to the inverse of the period. The working principle of the air spring sets narrow limits for the period or for the striking rate since the efficiency of the pneumatic coupling is dependent on an essentially resonant excitation. In the case of a deviation by more than 20% from an optimal striking rate, the striker 42 typically no longer follows the motion of the exciter 41. The optimal striking rate is prescribed by the weight of the striker 42 and by the geometric dimensions of the pneumatic chamber 44. An optimal striking rate is within the range between 25 Hz and 100 Hz.

The striking mechanism 6 given by way of an example has a piston-shaped exciter 41 and a piston-shaped striker 42 which are guided through a guide tube 45 along the working axis 4. The lateral surfaces of the exciter 41 and of the striker 42 rest against the inner surface of the guide tube 45. The pneumatic chamber 44 is sealed by the exciter 41 and by the striker 42 along the working axis 4 and by the guide tube 45 in the radial direction. Gaskets in the lateral surfaces of the exciter 41 and of the striker 42 can improve the air-tight sealing of the pneumatic chamber 44. The exciter 41 is driven the electric motor 9. An eccentric wheel 46 or another converter converts the rotational motion of the electric motor 9 into the periodic translatory motion of the exciter 41. The eccentric wheel 46 is connected to the electric motor 9.

The rotary drive 8 comprises the spindle 47 that is arranged coaxially to the working axis 4. The spindle 47 is, for instance, hollow, and the striking mechanism 6 is arranged inside the spindle. The tool socket 3 is placed on the spindle 47. The tool socket 3 can be detachably or permanently joined to the spindle 47 by means of a locking mechanism. The spindle 47 is connected to the electric motor via a reduction gear 48. The rotational speed of the spindle 47 is lower than the rotational speed of the electric motor 9. A slip clutch can be interconnected between the reduction gear 48 and the spindle 47. The spindle 47 rotates preferably continuously at a prescribed rotational speed. The rotational speed of the spindle 47 is within the range of 200 rpm (rotations per minute) and 1000 rpm, and the spindle 47 rotates clockwise. Along with the striking rate of the pneumatic striking mechanism 6, the drill bit 5 rotates between two consecutive strikes at a shifting angle of more than 30°, for instance, more than 30°, and 75° at the maximum. The typical shifting angle brings about an efficient removal of drill cuttings from the drilled hole using conventional drill bits 5.

What is claimed is:

1. A control method for a dust extraction module for a chiseling tool, the control method comprising the following steps:
    using a fan of the dust extraction module to draw in an air flow from a certain place of a substrate being worked by the tool;
    using a material detector to identify a material at the place of the substrate being worked by the tool; and
    adapting a suction power of the dust extraction module as a function of the identified material in order to set the air flow, whereby the air flow is greater than or equal to a rated value in the case of an iron-free mineral material, and whereby the air flow is less than the rated value but greater than zero in the case of a material containing iron.

2. The control method as recited in claim 1 wherein, in the case of the material containing iron, the air flow is one-fifth of the rated value at a maximum.

3. The control method as recited in claim 1 wherein the material detector uses a vibration sensor to detect vibrations of the dust extraction module or vibrations of a hand-held power tool into which the chiseling tool has been inserted, and that an evaluation unit identifies the material on the basis of the vibrations.

4. The control method as recited in claim 3 wherein a vibration above a threshold value is associated with the material containing iron whereas a vibration below the threshold value is associated with the iron-free mineral material.

5. The control method as recited in claim 1 wherein an evaluation unit transmits an actuating signal associated with the material to a fan control unit of the fan and, in response to the actuating signal, the fan control unit reduces a rotational speed of the fan in the case of the material containing iron as compared to the rotational speed in the case of the iron-free mineral material.

6. The control method as recited in claim 1 wherein an activity of a hand-held power tool striking the tool is detected, and whereby the air flow is drawn in as a response to the activity of the hand-held power tool.

7. The control method as recited in claim 1 wherein in the case of the iron-free mineral material the rotational speed is increased if an elevated quantity of dust is ascertained.

8. The control method as recited in claim 1 wherein in the case of the iron-free mineral material the rotational speed is adapted as a function of a filling level in a dust collecting container, as a function of pressure in a dust nozzle, or a function of pressure in an environment of the fan.

9. The control method as recited in claim 1 wherein the material containing iron is rebar.

10. The control method as recited in claim 9 wherein the air flow is increased again once the rebar is cut and cutting of the iron-free mineral material resumes.

11. The control method as recited in claim 1 wherein the rated value is with a range from 4 liters per second and 10 liters per second.

12. A control method for a chiseling hand-held power tool having a dust extraction module, the control method comprising the following steps:
periodical striking of a tool held in a tool socket of the hand-held power tool in order to work a certain place of a substrate;
using a fan of the dust extraction module to extract an air flow from the place of the substrate being worked by the tool;
using a material detector to identify a material at the place being worked by the tool; and
adapting a suction power of the dust extraction module as a function of the identified material in order to set the air flow, whereby the air flow is greater than or equal to a rated value in the case of an iron-free mineral material, and whereby the air flow is less than the rated value but greater than zero in the case of a material containing iron, whereby the periodic striking is exerted onto the tool in the case of the iron-free mineral material and in the case of the material containing iron.

13. The control method as recited in claim 12 wherein a striking power of the hand-held power tool in the case of the material containing iron differs by less than 20% from the striking power in the case of the iron-free mineral material.

14. The control method according to claim 12 wherein the dust extraction module is switched on at a beginning of the periodical striking.

15. A dust extraction device comprising:
a fan to draw in an air flow from a certain place of a substrate being worked by a tool;
a dust filter;
a dust collecting container;
a material detector to identify a material at the place being worked by the tool; and
a fan control unit adjusting, depending on the identified material, a suction power of the dust extraction device in order to set the air flow, the air flow being greater than or equal to a rated value in the case of an iron-free mineral material, and the air flow being less than the rated value but greater than zero in the case of a material containing iron.

16. A hand-held power tool comprising:
a tool socket to hold a tool;
an electric motor;
a striking mechanism driven by the electric motor and periodically striking the tool; and
a dust extraction device having a fan to draw in an air flow from a certain place of a substrate being worked by the tool, a dust filter and a dust collecting container, a material detector to identify a material at the place being worked by the tool, and a fan control unit adjusting, depending on the identified material, a suction power of the dust extraction module in order to set the air flow, the air flow being greater than or equal to a rated value in the case of an iron-free mineral material, and the air flow being less than the rated value but greater than zero in the case of a material containing iron.

17. A control method for a dust extraction module for a chiseling tool, the control method comprising the following steps:
using a fan of the dust extraction module to draw in an air flow from a certain place of a substrate being worked by the tool;
using a material detector to identify a material at the place of the substrate being worked by the tool; and
adapting a suction power of the dust extraction module as a function of the identified material in order to set the air flow, whereby the air flow is greater than or equal to a rated value in the case of an iron-free mineral material, and whereby the air flow is less than the rated value in the case of a material containing iron; wherein, in the case of the material containing iron, the air flow is one-fifth of the rated value at a maximum.

18. A control method for a dust extraction module for a chiseling tool, the control method comprising the following steps:
using a fan of the dust extraction module to draw in an air flow from a certain place of a substrate being worked by the tool;
using a material detector to identify a material at the place of the substrate being worked by the tool; and
adapting a suction power of the dust extraction module as a function of the identified material in order to set the air flow, whereby the air flow is greater than or equal to a rated value in the case of an iron-free mineral material, and whereby the air flow is less than the rated value in the case of a material containing iron, wherein an evaluation unit transmits an actuating signal associated with the material to a fan control unit of the fan and, in response to the actuating signal, the fan control unit reduces a rotational speed of the fan in the case of the material containing iron as compared to the rotational speed in the case of the iron-free mineral material.

\* \* \* \* \*